US007388600B2

(12) United States Patent
Prudhomme et al.

(10) Patent No.: US 7,388,600 B2

(45) Date of Patent: Jun. 17, 2008

(54) MAIL-SORTING INSTALLATION COMPRISING A COLOUR READING HEAD WITH TWO CAMERAS

(75) Inventors: Cyrille Prudhomme, Champigny sur Marine (FR); Claude Mitte, Montigny les Cormeilles (FR); Agnés Gamez Cuatzin, Vincennes (FR)

(73) Assignee: Solystic, Gentilly Cedex (FR)

( * ) Notice: Subject to any disclaimer, the term of this patent is extended or adjusted under 35 U.S.C. 154(b) by 733 days.

(21) Appl. No.: 10/474,351

(22) PCT Filed: Jul. 10, 2003

(86) PCT No.: PCT/FR03/02182

§ 371 (c)(1), (2), (4) Date: Oct. 9, 2003

(87) PCT Pub. No.: WO2004/007101

PCT Pub. Date: Jan. 22, 2004

(65) Prior Publication Data

US 2004/0233278 A1 Nov. 25, 2004

(30) Foreign Application Priority Data

Jul. 11, 2002 (FR) .................................. 02 08740

(51) Int. Cl.
*H04N 7/18* (2006.01)

(52) U.S. Cl. .......................................... 348/92; 348/86

(58) Field of Classification Search ........... 348/70-140
See application file for complete search history.

(56) References Cited

U.S. PATENT DOCUMENTS

| | | | | |
|---|---|---|---|---|
| 5,524,152 | A * | 6/1996 | Bishop et al. | 382/165 |
| 5,912,698 | A | 6/1999 | Graulich et al. | |
| 6,303,889 | B1 * | 10/2001 | Hayduchok et al. | 209/584 |
| 7,065,229 | B2 * | 6/2006 | Caillon et al. | 382/101 |

* cited by examiner

*Primary Examiner*—Andy S. Rao
(74) *Attorney, Agent, or Firm*—Sughrue Mion, PLLC

(57) ABSTRACT

The read head (1) for a postal sorting installation serves to pick up a digital image of each postal object using a high-resolution camera (3) providing a multiple level gray scale. The read head also has a low-resolution color camera (4), the two cameras (3, 4) being placed in such a manner as to acquire simultaneously two superposable digital images of each postal object. The superposable high-resolution gray scale image and low-resolution color image are intended to be combined in order to provide a high-resolution color image.

5 Claims, 2 Drawing Sheets

MAIL-SORTING INSTALLATION COMPRISING A COLOUR READING HEAD WITH TWO CAMERAS

BACKGROUND OF THE INVENTION

The invention relates to a read head for acquiring digital images of postal objects in a postal sorting installation, said read head including a high-resolution camera providing a multiple level gray scale. The invention is more particularly designed for a postal sorting installation in which postal objects are processed by video coding so that an operator inputs the destination address on the basis of the digital image of the object that is displayed on a screen on the video-coding station of the operator. The digital images are generally transmitted in real time from a computerized management system of the sorting installation to the video-coding station via a computer network. In view of the processing throughput, the digital images must be small in size otherwise it is not possible to video code the postal objects in real time.

Generally, the size of the images is restricted by limiting their resolution and/or their palette of colors. Conventionally, the images acquired are high-resolution gray scale images because the size of high-resolution color images is not compatible with transfer rates over current computer networks. The images displayed on the screen of the video-coding station are currently gray scale images, which reduces the effectiveness of the operator and the comfort conditions under which the operator works.

Document U.S. Pat. No. 5,912,698 discloses a read head for acquiring digital images of postal objects in a postal sorting machine. That read head comprises a high-resolution gray scale camera and a low-resolution color camera. The two cameras are disposed in the read head so as to provide two separately acquired and superposable digital images of each postal item.

SUMMARY OF THE INVENTION

An object of the invention is to provide a read head as defined above with which the superposability of the separately acquired images is improved.

To this end, the invention provides a read head for acquiring digital images of postal objects in a postal sorting installation, said read head comprising a high-resolution camera providing a multiple level gray scale and a low-resolution color camera, said cameras being disposed in said read head so as to form simultaneously two separately acquired and superposable digital images of each postal item, said read head being provided with an observation window through which each of the two cameras takes a respective image of each postal object, said read head being characterized in that it further comprises a light splitter system for splitting the light flux from the window and directing it to each of the cameras so that both cameras simultaneously take images of the same object points from the same viewing angle.

With this construction, a high-resolution gray scale image and a low-resolution color image are acquired simultaneously from the same viewing angle for each postal object. The two images are transmitted to the video-coding station on which a high-resolution color image of the postal item is displayed after the two received images have been combined. The invention thus makes it possible to provide a high-resolution color image while limiting the quantity of additional data compared with the high-resolution gray scale acquisition that is in common use. Advantageously, the high-resolution color image may also be used to improve optical character recognition by facilitating recognition of address blocks in the image of a postal object. The high-resolution color image can also be used to facilitate automatic recognition of postage or "franking" marks.

In a preferred embodiment of the invention, the cameras are disposed at right angles in the read head, and a splitter plate is disposed at substantially 45° relative to each camera, so that both cameras take images of the same object point. The two images can thus be acquired simultaneously by the same read head and through the same observation window, thereby improving their superposability.

BRIEF DESCRIPTION OF THE DRAWINGS

The invention is described in more detail below with reference to the accompanying drawings which show an embodiment of the invention by way of non-limiting example, and in which.

DETAILED DESCRIPTION OF THE INVENTION

Figure 1:
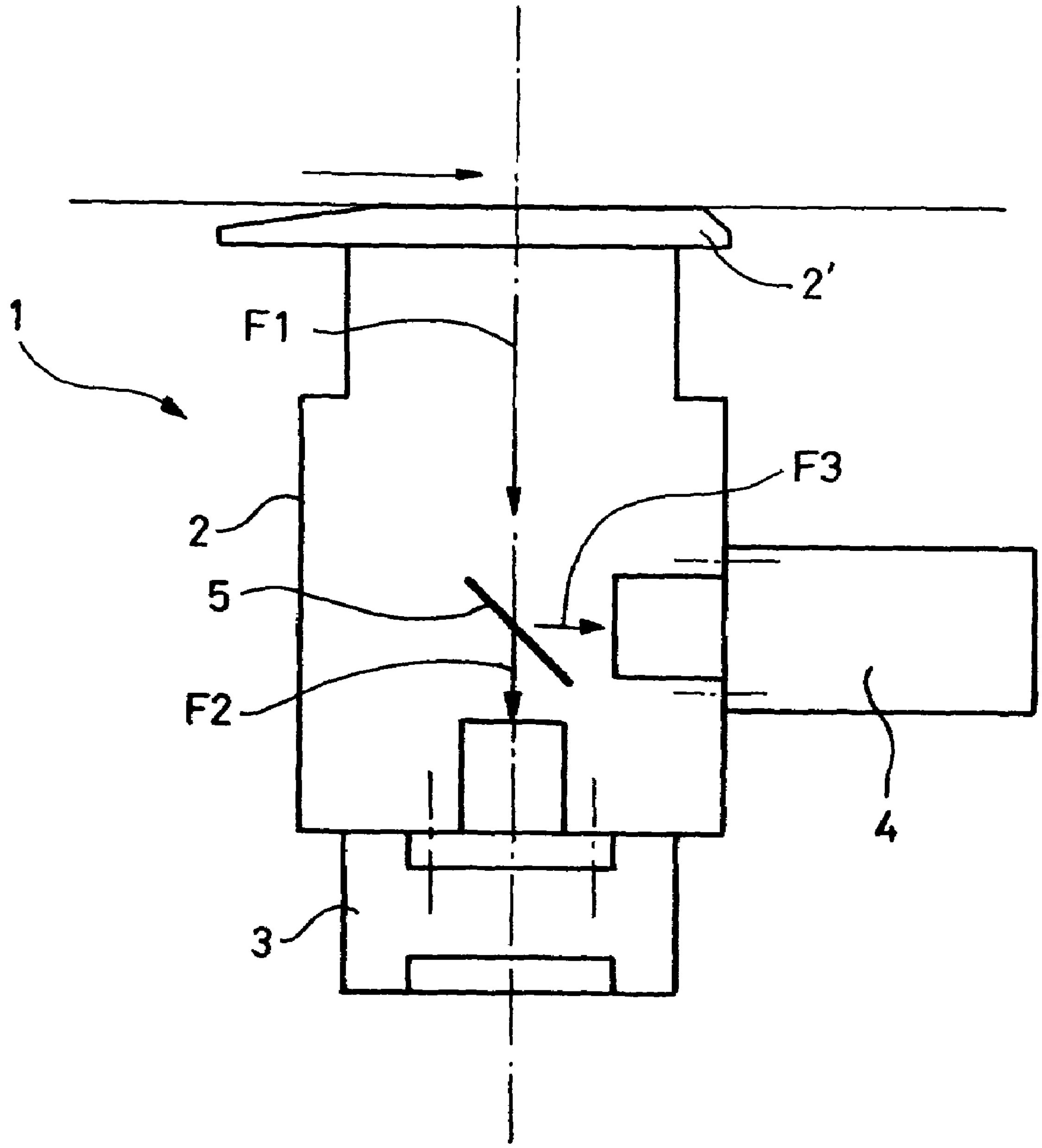
FIG. 1 is a diagrammatic view of a read head of the invention.

As shown in FIG. 1, a read head 1 includes a box 2 constituting a camera obscura with an observation window 2' past which postal objects advance to be photographed. A high-resolution camera 3 for providing a multiple level gray scale is fixed to the box while being disposed facing the observation window 2' for the purpose of acquiring a digital image of a postal object visible in said window. In the invention, the read head 1 includes another camera 4 which is a low-resolution color camera. The low-resolution color camera 4 is disposed so as to acquire simultaneously another digital image of the postal item that is superposable on the image acquired by the gray scale camera 3. The two images, which are acquired separately, serve to be combined, e.g. in the video-coding station, so as to form one high-resolution color image of the postal object, which is described in detail below. For example, the two cameras 3 and 4 may face the observation window 2' so as to provide images that are substantially superposable. In the event that the two images acquired have an offset that is too large, digital processing may be performed on one of the two images in order to correct the offset.

Acquiring two superposable images in the read head from the same viewing angle in accordance with the invention may be achieved by using an optical system placed between the cameras and the observation window, which system serves to split the light flux coming from the window into two. The light splitter system used may, for example, be a splitter cube or a fiber anamorphoser.

In a preferred embodiment, the light splitter system chosen is a splitter plate 5 disposed substantially at forty-five degrees relative to the plane of the observation window. The light flux F1 coming from the observation window is split by said plate into two fluxes F2 and F3 positioned at right angles relative to each other. More particularly, a first half F2 of the light flux passes through the splitter plate 5 to reach the lens of the high-resolution gray scale camera 3 which is placed facing the observation window while being disposed at forty-five degrees relative to the splitter plate. A second half F3 of the light flux is reflected by the splitter plate 5 so as to be directed parallel to the plane of the window 2' towards the low-resolution color camera 4 which is disposed at forty-five degrees relative to the splitter plate. As shown diagrammatically in FIG. 1, the camera 3 faces the observation window 2' and the camera 4 is disposed parallel to the plane of said observation window, the splitter plate 5 being disposed at forty-five degrees relative to the plane of the window so as to form angle of forty-five degrees with the axis of each of the cameras 3 and 4. The mechanical and optical imperfections of the target point constituted by the postal object thus affect the gray scale camera and the color camera in strictly identical manner. The superposability of the images delivered by the cameras is thus improved, and the two images can be acquired simultaneously. Such a splitter plate is known per Se, it is generally made of treated glass, and it offers the advantage of being very low in cost compared with the other possible optical systems.

In the example shown in FIG. 1, the intensity of each of the light fluxes F2 and F3 received respectively by the cameras is substantially one half of the light flux F1 coming form the observation window. This reduction in light intensity can advantageously be compensated by a larger aperture in the diaphragm of each camera. Another way of compensating for said reduction may consist in increasing the illumination of the postal object.

Advantageously, the resolution of the color camera is much lower than the resolution of the gray scale camera. In this way, the quantity of data to be transmitted in order to form a high-resolution color image on the video-coding screen is reduced significantly. By way of example, if the resolution of the color camera (in terms of number of pixels per unit length) is four times less than that of the gray scale camera, the data size of the image delivered by the low-resolution color camera is equal to 18% of the data size of the high-resolution gray scale image. As shown in this example, the quantity of additional data for forming a high-resolution color image on the video-coding screen is small relative to the quantity required for high-resolution gray scale acquisition.

More particularly, the two images are superposable, ignoring a scale factor, which means that they show the same portion of the postal object at different resolutions. In the above example, one low-resolution color pixel corresponds to sixteen high-resolution gray scale pixels.

Figure 2:
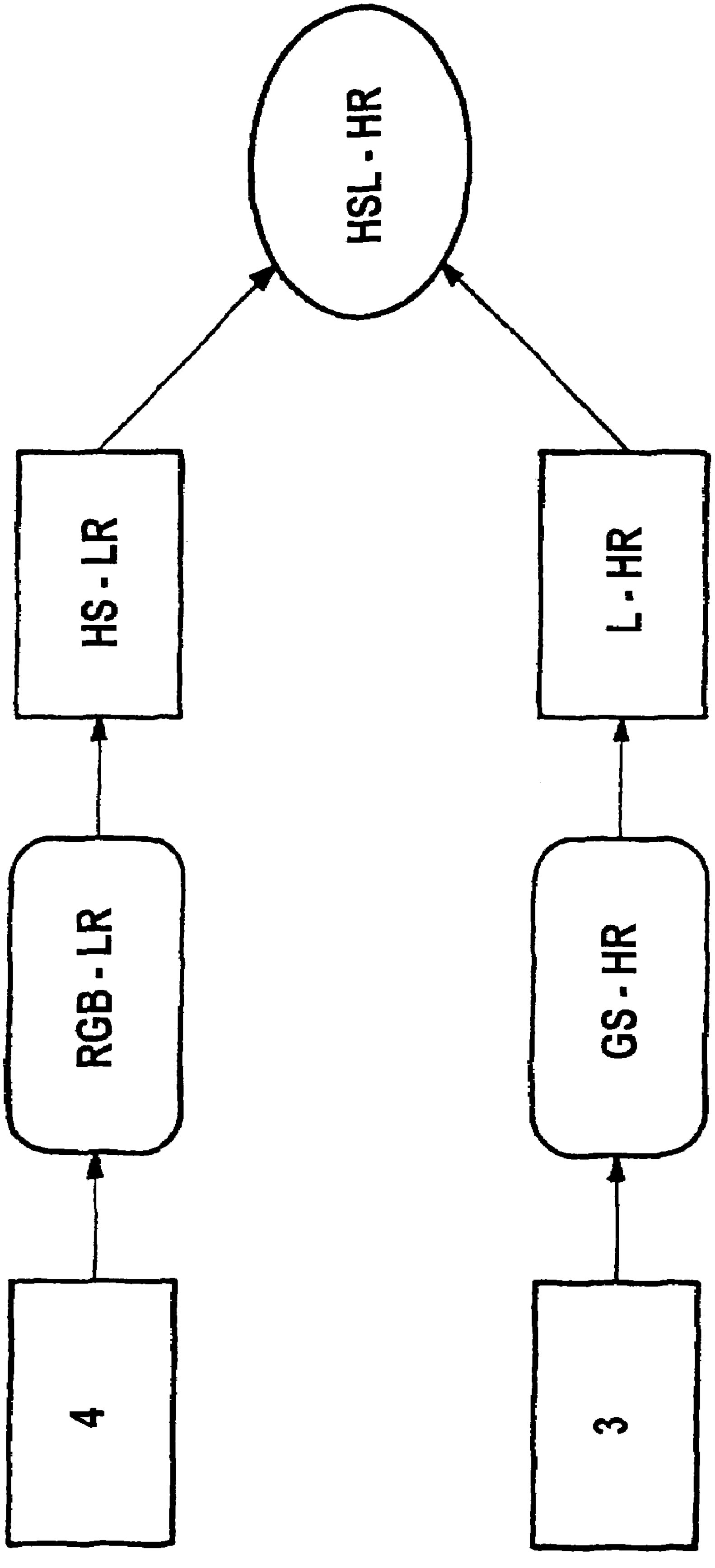
FIG. 2 is a view in the form of a flow chart showing how two images are combined to form one high-resolution color image.

FIG. 2 is a highly diagrammatic flow chart showing the processing for combining two images acquired by the read head for the purpose of displaying one high-resolution color image on the video-coding station. For example, this processing may be implemented by computerized means on a video-coding station, or in the computerized management system of the postal sorting installation.

For each object, the data provided by the read head 1 comprises two superposable images that are submitted to a processing unit which may be a video-coding station or else the computerized management system of the postal sorting installation. A low-resolution color image is acquired by the camera 4 in Red-Green-Blue (RGB) format, which corresponds to the block RGB-LR of FIG. 2. Simultaneously, a gray scale (GS) image is acquired by the camera 3 which corresponds to the block GS-HR of FIG. 2. Two options can then be envisaged. In a first option, the RGB-LR image is transmitted to a processing unit in which it is converted into a Hue-Saturation-Luminance (HSL) representation. In the second option, the RGB-LR image is converted into an HSL representation before it is transmitted. In which case, the luminance layer of the image is not transmitted, which makes it possible to reduce further the quantity of data of the color image. The converted color image whose luminance layer is discarded is represented by the block HS-LR. As is known from the state of the art, the luminance component (L) of a pixel in an HSL representation corresponds to the gray level in a gray scale image. The gray scale image directly constitutes a luminance image, which is represented by the block L-HR. The two images are then combined to form a high-resolution image in HSL format, which is represented by the block HSL-HR. More particularly, the high-resolution color image is constructed by combining the luminance layer from the high-resolution gray scale image with the Hue (H) and Saturation (S) layers from the low-resolution image coming from the camera 4. Such combining is made possible by the fact that the two images are superposable.

More particularly, it is known that the eye is very sensitive to luminance whereas it is less sensitive to saturation and to hue in an image. Therefore, under-sampling (by low-resolution acquisition) of the saturation and hue layers is of no great loss to the human eye.

The invention claimed is:

1. A read head for acquiring digital images of postal objects in a postal sorting installation, said read head comprising a high-resolution camera providing a high resolution multiple level gray scale image and a low-resolution color camera having a resolution lower than the resolution of said gray scale camera and providing a low resolution RGB color image, said cameras being disposed in said read head so as to form simultaneously two separately acquired and superposable digital images of each postal item, said read head being provided with an observation window through which each of the two cameras takes a respective image of each postal object, said read head being characterized in that it further comprises a light splitter system for splitting the light flux from the window and directing it to each of the cameras so that both cameras simultaneously take images of the same object points from the same viewing angle, said read head further comprising converting means for converting said low resolution RGB color image into a low resolution HSL color image and processing means for combining said low resolution HSL color image with said high resolution multiple level gray scale image for forming a high resolution HSL color image.

2. A read head according to claim 1, in which the splitter device is a splitter plate made of treated glass.

3. A read head according to claim 2, in which said splitter plate is disposed at 45° relative to the plane of the window and in which each camera is disposed at substantially 45° relative to said splitter plate.

4. A postal sorting installation including a read head according to claim 1.

5. The use of an "HSL" representation in an installation according to claim 4 for transmitting said images from said read head to said processing unit.

* * * * *